(No Model.)
A. T. BROWN & G. F. STILLMAN.
PNEUMATIC TIRE FOR VEHICLES.
No. 488,494. Patented Dec. 20, 1892.
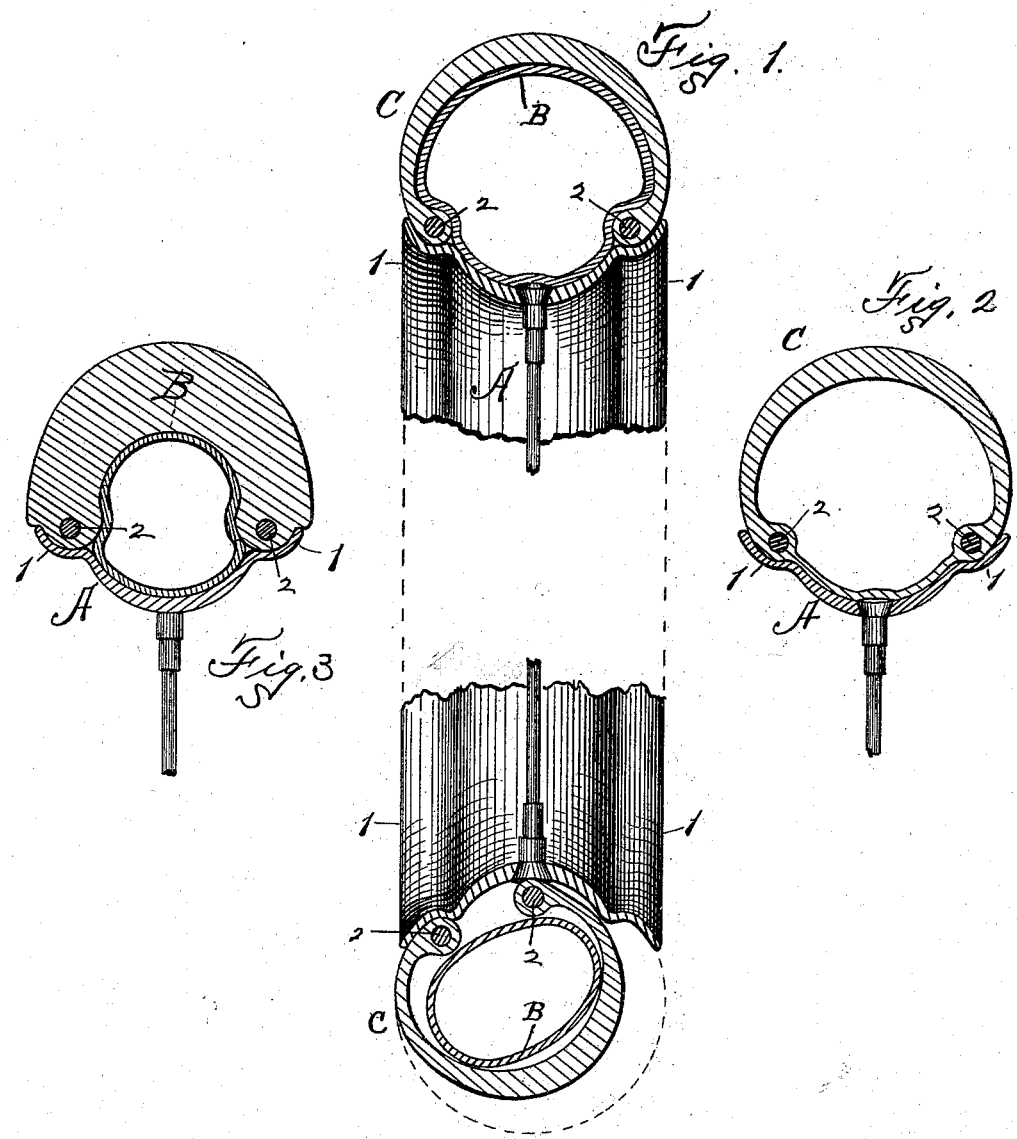

UNITED STATES PATENT OFFICE.

ALEXANDER T. BROWN AND GEORGE F. STILLMAN, OF SYRACUSE, NEW YORK.

PNEUMATIC TIRE FOR VEHICLES.

SPECIFICATION forming part of Letters Patent No. 488,494, dated December 20, 1892.

Application filed June 20, 1891. Serial No. 396,988. (No model.)

*To all whom it may concern:*

Be it known that we, ALEXANDER T. BROWN and GEORGE F. STILLMAN, of Syracuse, in the county of Onondaga, in the State of New York, have invented new and useful Improvements in Tires for Vehicles, of which the following, taken in connection with the accompanying drawings, is a full, clear, and exact description.

This invention is an improvement in inflatable, or what are known as pneumatic, wheel tires for cycles and other vehicles.

The primary object of the invention is to provide a tire which, while possessing the resiliency and life of what are technically known as true, or high grade, pneumatics, may be readily and easily detached from or applied to the rim of a wheel.

The improvement subject of our application and by which this object is realized involves as its chief characteristics—first, an exteriorly grooved rim with divergent side edges or flanges, and second a tire comprising, or confining, an inflatable tube, seated and contained partly within the grooved rim, and made rigid or non extensible circumferentially along two lines on opposite sides which lie within the groove, below the edges but above the bottom or deepest part of the same.

In the practical carrying out of our invention we secure the best results by attaching to or incorporating with the tire two metallic wires or bands, endless or having connected ends, and combining such a tire with a peripherally grooved rim having in each divergent side or flange and above the bottom or deepest part of the groove a supplemental groove or an offset or shoulder up into or onto which the wires or bands are forced by the air pressure when the tire is inflated and where they are seated and retained by that pressure. A tire thus constructed requires no permanent connection of any description between it and the rim, as the internal air pressure alone is amply sufficient to maintain it in position thereon. It further obviates the use of tightening appliances or accessories other than those required for inflation; or any manipulation of the same in the operation of applying the tire to, or removing it from, the rim.

In the accompanying drawings we have illustrated the invention in the preferred form above described.

Figure 1 is a transverse sectional elevation of a wheel, the upper part showing the tire inflated and in position of use, and the lower part showing the tire in the uninflated condition in which it is during the operation of passing it over the edges of the rim and into the groove. Fig. 2 shows in cross section a modification of the tire. Fig. 3 shows in cross section a further modification.

A is the peripherally grooved rim with diverging side edges or flanges, having in each diverging side, above the bottom but below the edges of the groove, an offset, shoulder or auxiliary groove 1, intended to form a seat for one of the bands or wires of the tire.

C is the tire which is made of the usual materials, and may be, and preferably is, of the concavo-convex form shown in Fig. 1, with its longitudinal edges disconnected from each other, and having secured or molded or embedded in them the endless wires or bands 2 of metal or other material which will not stretch under the conditions of use here involved. These bands 2 are of greater diameter than the wheel rim at the bottom of the groove therein, and of less diameter than the side edges of the rim. They are in fact of such diameter, that when the tire is fully inflated they will snugly and tightly fit and seat themselves on or in the shoulders or grooves 1 of the rim. Between the tire and the rim is the usual pneumatic sack or tube B, which is to be inflated by ordinary or suitable appliances for that purpose. We have not deemed it necessary to represent such appliances inasmuch as they are well known and in common use.

At the time the tire is put on the rim, the elastic tube B which has been previously sprung into place on the rim, is deflated and collapsed. To put the tire on, the wire or band-reinforced edges of one portion of the tire are placed within the deepest portion of the groove, on one side of the rim, thus permitting the other portions of those edges to be slipped over the remaining portion of the rim, because the distance between the bottom of the groove in which the one part of the tire is already contained and the outer edge of the diametrically opposite part of the rim, is less than the internal diameter of the wire reinforced edges of the tire. After this has been done the tube B is inflated, and the air pressure acting upon the outer part C, which in this particular illustration of our invention is virtually a casing, cover, or "shoe" as it is sometimes termed, for the tire, is pressed outwardly equally in all directions, thus forcing its rings or bands 2 up and out toward the edges of the groove until they reach the shoulders or auxiliary grooves 1 where they at once seat themselves and are there retained by the pressure.

There is no difference between the structure shown in Figs. 1 and 3—save that in Fig. 3 the tire or outer casing or shoe is made very much thicker than that in Fig. 1, as is usual in that class of tires known as cushion tires. In each case there is the same circumferential reinforcement of the tire along two lines within the grooved rim but above the bottom of the same.

In Fig. 2 the wire reinforced edges of the tire are continuously connected, thus forming a tubular tire; but in this modification the lines 2 of reinforcement bear the same relation to the groove in the rim as in the other illustrations of our invention previously described.

We prefer that the bands be welded to be continuous or that the ends thereof be connected by suitable means so that the tire may be adjusted to the proper fit upon the rim, but not to be used in removing the tire from or attaching it to the rim, and in the claim in which these bands are referred to as endless bands we do not limit ourselves to a welded band but regard as within our invention a band the ends of which are connected in any manner.

Having described our improvement and the best way now known to us of carrying the same into effect, what we claim herein as new and of our own invention is as follows:

1. In combination with an exteriorly grooved rim having divergent side edges or flanges, a tire comprising, or confining, an inflatable tube, seated and contained partly within the grooved rim, and made rigid or inextensible circumferentially along two lines lying within the groove below the edges but above the deepest part of the same by means of circumferential reinforcements secured to or incorporated with it, and adapted to be held in place in the rim by the action of the internal air pressure.

2. The combination with a wheel rim having diverging side edges or flanges of a tire having endless bands embedded in its side edges, and an inflatable tube within the tire substantially as and for the purposes hereinbefore set forth.

3. A wheel rim having a central peripheral groove and a shoulder or supplemental groove of increased diameter at each side of said central groove, in combination with a pneumatic tire having its expansible tube disposed in said central groove, and a wire annulus secured in each edge of the tire casing and disposed in said supplemental grooves, substantially as and for the purposes hereinbefore set forth.

4. The combination with a peripherally grooved wheel rim having divergent side edges or flanges, of a pneumatic tire having secured to or incorporated within it two circumferential lines of inextensible reinforcing material so located and of such diameter relatively to the grooved rim as to permit the tire to be applied to or removed from the rim only when it is in deflated condition, substantially as set forth.

In witness whereof we have hereunto set our hands this 12th day of June, 1891.

ALEX. T. BROWN.
GEO. F. STILLMAN.

In presence of—
HOWARD P. DENISON,
C. B. KINNE.